United States Patent
Morawietz et al.

(10) Patent No.: US 11,943,837 B2
(45) Date of Patent: Mar. 26, 2024

(54) METHOD AND DEVICES FOR MANAGING SUBSCRIPTION PROFILES ON A SECURITY ELEMENT

(71) Applicant: GIESECKE+DEVRIENT MOBILE SECURITY GMBH, Munich (DE)

(72) Inventors: Andreas Morawietz, Munich (DE); Nils Nitsch, Markt Schwaben (DE); Ulrich Huber, Munich (DE); Ulrich Wimbock, Los Gatos, CA (US)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 367 days.

(21) Appl. No.: 17/427,260

(22) PCT Filed: Jan. 29, 2020

(86) PCT No.: PCT/EP2020/000029
§ 371 (c)(1),
(2) Date: Jul. 30, 2021

(87) PCT Pub. No.: WO2020/156752
PCT Pub. Date: Aug. 6, 2020

(65) Prior Publication Data
US 2022/0132297 A1    Apr. 28, 2022

(30) Foreign Application Priority Data
Feb. 1, 2019    (DE) .................. 10 2019 000 743.3

(51) Int. Cl.
*H04W 8/04*    (2009.01)
*H04W 8/08*    (2009.01)
(Continued)

(52) U.S. Cl.
CPC ............. *H04W 8/183* (2013.01); *H04W 8/04* (2013.01); *H04W 8/08* (2013.01); *H04W 8/205* (2013.01); *H04W 12/06* (2013.01)

(58) Field of Classification Search
CPC ....... H04W 8/183; H04W 8/04; H04W 8/205; H04W 12/06
(Continued)

(56) References Cited

U.S. PATENT DOCUMENTS 10,292,043 B2    5/2019  Nitsch
2013/0303234 A1  11/2013  Kakkad
(Continued)

FOREIGN PATENT DOCUMENTS

| | | |
|---|---|---|
| DE | 102015012943 A1 | 4/2017 |
| EP | 3162099 A1 | 5/2017 |
| WO | 2015018533 A1 | 2/2015 |

OTHER PUBLICATIONS

International Search Report with Written Opinion from PCT Application No. PCT/EP2020/000029, dated May 13, 2020.
(Continued)

*Primary Examiner* — Ted M Wang
(74) *Attorney, Agent, or Firm* — Workman Nydegger

(57) ABSTRACT

A method for managing subscription profiles of a security element, which is provided for use in a mobile end device and on which a profile manager and at least one first subscription profile is loaded, includes: loading a second subscription profile from a subscription management server; checking whether the at least one first loaded subscription profile satisfies a predetermined condition; and putting the at least one first subscription profile out of operation when the at least one first subscription profile satisfies the predetermined condition.

9 Claims, 1 Drawing Sheet

(51) Int. Cl.
*H04W 8/18* (2009.01)
*H04W 8/20* (2009.01)
*H04W 12/06* (2021.01)

(58) Field of Classification Search
USPC .......................................................... 455/433
See application file for complete search history.

(56) References Cited

U.S. PATENT DOCUMENTS

| 2017/0215063 | A1 | 7/2017 | Wozniac et al. |
| 2018/0131699 | A1 | 5/2018 | Park et al. |
| 2018/0270363 | A1 | 9/2018 | Guday et al. |
| 2018/0302782 | A1 | 10/2018 | Nitsch |
| 2019/0324735 | A1* | 10/2019 | Park .................. H04W 12/06 |
| 2019/0380026 | A1* | 12/2019 | Lee ..................... H04W 8/20 |

OTHER PUBLICATIONS

German Office Action from Corresponding DE Application No. 102019000743.3, dated Mar. 25, 2019.

International Preliminary Report on Patentability from PCT Application No. PCT/EP2020/000029, dated Jul. 27, 2021.

"RSP Technical Specification Version 2.2.1," GSM Association, retrieved from https://www.gsma.com/newsroom/wp-content/uploads//SGP.22-v2.2.1-2.pdf on Oct. 12, 2021, published Dec. 18, 2018, pp. 1-250.

* cited by examiner

METHOD AND DEVICES FOR MANAGING SUBSCRIPTION PROFILES ON A SECURITY ELEMENT

BACKGROUND

The invention relates to a method and devices for managing subscription profiles of a security element which is provided for use in a mobile end device.

The communication via a mobile end device, for example a mobile phone, via a mobile or cellular communication network (a so-called Public Land Mobile Network, PLMN) which is operated by a mobile network operator (MNO) generally requires that the mobile end device is equipped with a security element for securely storing data which uniquely identify the user of the mobile end device (also designated as a subscriber).

In the context of a mobile end device which is configured to communicate according to the GSM (Global System for Mobile Communications) standard, the security element is a subscriber identity module (SIM), usually supplied in the form of a chip card. According to the GSM standard, the SIM contains credentials for authenticating and identifying the user of the mobile end device, including in particular an international mobile subscriber identity (IMSI) and an authentication key $K_i$. These credentials are usually stored on the SIM as part of a subscription profile by the manufacturer of the security element or the mobile network operator during a SIM personalization process before the SIM is supplied to the user of the mobile end device.

A non-personalized security element is generally not suitable for use in a mobile end device, i.e. the use of the services supplied by a PLMN with a non-personalized SIM without a subscription profile is not possible.

When utilizing the services supplied by an MNO, in particular the communication via the PLMN provided by the MNO, the user of the mobile end device is usually charged a certain monthly fee by the MNO. If the mobile user wants to change to another MNO, for example because he/she is in another country, he/she generally has to manually replace the SIM supplied by the current MNO with another SIM. With the other SIM which is supplied by the new MNO and contains the new subscription profile, the mobile end device can connect to the PLMN of the new MNO.

As this approach is cumbersome, methods have been developed to wirelessly (Over the Air, OTA) load a new subscription profile onto the security element having the already existing subscription profile and to perform a change from the already existing subscription profile to the new subscription profile associated with the new MNO.

In this respect, WO 2015/018533 A1 discloses a method in which a new subscription profile can be loaded from a subscription management server onto the security element of a mobile end device in a simple and secure manner. For this purpose, a command script is utilized that defines a sequence of commands of the subscription management server. A connection to the new mobile network is made using a newly loaded subscription profile, the command sequence defined by the command script being executed.

Typically, the user of the mobile end device is offered a choice of which subscription profile he/she wants to use when a plurality of subscription profiles are loaded on the security element. This can make the handling of a large number of subscription profiles loaded on the security element unwieldy under certain circumstances.

SUMMARY

It is an object of the present invention to provide a method and a device for managing subscription profiles of a security element, which enable easier use.

According to a first aspect, a method for managing subscription profiles of a security element is proposed, the security element being provided for use in a mobile end device. On the security element, a profile manager and at least one first subscription profile are loaded. The method comprises the step of loading a second subscription profile from a subscription management server. The method comprises the further step of checking whether the at least one first loaded subscription profile satisfies a predetermined condition. Finally, the method comprises the step of putting the at least one first subscription profile out of operation when the at least one first subscription profile satisfies the predetermined condition.

The proposed method has the advantage that the user of the mobile end device does not have to perform an active profile maintenance. A profile maintenance may be expedient in some circumstances, because once a subscription profile is downloaded to the security element it remains on the security element even when further subscription profiles are loaded onto the security element and the original subscription profile is no longer needed. For the user of a mobile end device having a security element onto which subscription profiles can be subsequently loaded, this facilitates the profile maintenance.

The security element is a SIM card (Subscriber Identity Module) or a UICC (Universal Integrated Circuit Card). These security elements, which are in card form, are inserted into corresponding reading devices of the mobile device and can also be removed from these and replaced. It can also be an eSIM=embedded Subscriber Identity Module) or an eUICC (eUICC=embedded Universal Integrated Circuit Card), which represent security elements or identification modules firmly integrated in the mobile end device.

According to an expedient embodiment, the step of checking whether the at least one first loaded subscription profile satisfies a predetermined condition and the step of putting out of operation are performed by the profile manager. The profile manager may be, for example, the Issuer Security Domain Root, ISD-R, defined in the GMSA SGP.22 specification. Basically, other profile managers can also be used to perform the method according to the invention.

According to a further embodiment, the step of putting out of operation comprises deleting the at least one first subscription profile. Alternatively, the step of putting out of operation may comprise deactivating the at least one first subscription profile. In both cases, by the profile manager there can be effected a triggering of the execution with the help of an APDU command, such as a DELETE or DISABLE command.

A further useful embodiment provides that user information is generated and output on a user interface of the mobile end device, which signals the putting out of operation of the at least one first subscription profile to a user of the mobile end device. In particular, the user information comprises interaction information the activation of which by the user is monitored, and upon ascertained activation putting the at least one first subscription profile out of operation is prevented or performed. This grants the user of the mobile end device a "right of veto" regarding putting the at least one first subscription profile out of operation. The profile manager, e.g. ISD-R, informs the user of the mobile end device via a selection screen which can be displayed on the mobile end device that the at least one first subscription profile is to be put out of operation and gives the user the possibility of cancelling or confirming the procedure. For this purpose, the LPA (Local Profile Assistant) of the security element can be utilized by the profile manager to display the user information.

A further expedient embodiment comprises as the predetermined condition one or several of the following:
- leaving a spatially delimited region, in particular when crossing a national border, which requires the change of a subscription profile due to a different MNO;
- ascertaining that an identification code (PIN=Personal Identification Number) of the security element has been entered incorrectly by the user a predetermined number of times;
- ascertaining that a call to a predetermined number has been initiated or performed by the mobile end device (a so-called one-time call, as utilized for prepaid subscriptions or for emergency calls to a specified telephone number);
- ascertaining that a permissible number of authentications of the security element has been performed;
- ascertaining that the at least one first subscription profile has been deleted or deactivated in the Home Location Register (HLR) of the MNO associated with the first subscription profile.

If one or more of the conditions are met, the at least one first subscription profile is deleted or deactivated automatically or after confirmation by a user, a profile maintenance on the security element not having to be initiated by a user himself.

According to a second aspect, a computer program product is proposed which can be loaded directly into the internal memory of a digital computer and comprises software code portions with which the steps of the method described herein are executed when the product runs on a computer. The computer may be a computing unit of a mobile end device as described herein. The computer programme product may be present in the form of a data carrier, such as a DVD, a CD-ROM, a USB memory stick and the like. The computer program product may also be present as a signal transmittable over a wireless or wired network.

According to a third aspect, a security element is proposed which is provided for use in a mobile end device, a profile manager and at least a first subscription profile are loaded on the security element. The security element is adapted to load a second subscription profile from a subscription management server. The security element is adapted to check whether the at least one first loaded subscription profile satisfies a predetermined condition. Finally, the security element is adapted to put the at least one first subscription profile out of operation when the at least one first subscription profile satisfies the predetermined condition.

The security element proposed has the same advantages as were described hereinabove in connection with the method according to the invention. Furthermore, the security element is adapted to execute the preferred embodiments stated in the dependent claims.

According to a fourth aspect, a mobile end device is proposed which comprises a security element of the type adapted according to this description.

BRIEF DESCRIPTION OF THE DRAWINGS

The invention will be described more closely hereinafter with reference to the appended figures.

DETAILED DESCRIPTION OF VARIOUS EMBODIMENTS

Figure 1:
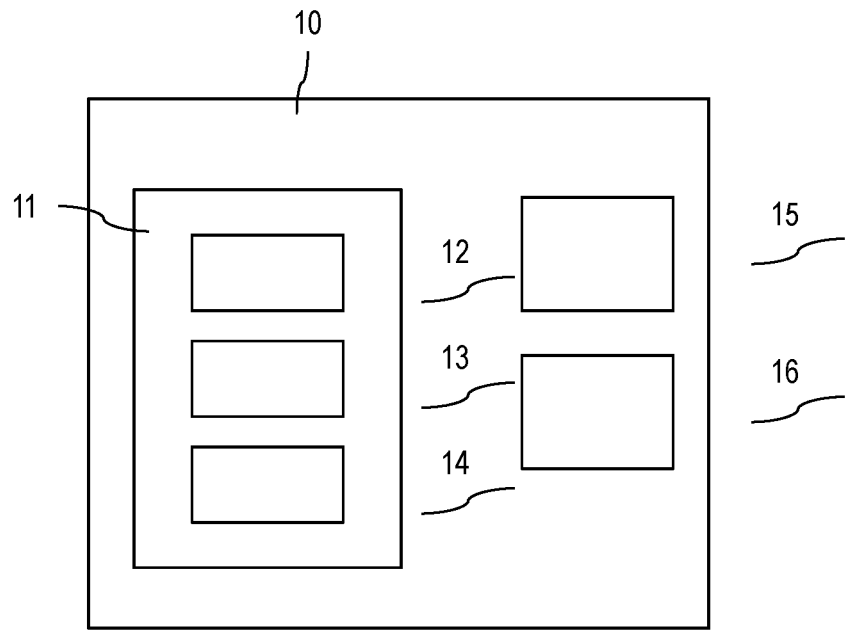
FIG. 1 shows a schematic representation of a mobile end device of the invention having a security element adapted according to the invention.

FIG. 1 shows a schematic representation of a mobile end device 10 according to the invention. In addition to the components of a sending/receiving means 15 and a user interface 16, which can be present in any shape, e.g. in the form of a touch display for visualisation and input of user information, the mobile end device 10 comprises a security element 11. The security element 11 (sometimes also referred to as an identification module) may be present in the form of a SIM card or a UICC. Alternatively, the security element may also be an embedded security element in the form of an eSIM or an eUICC, which are an integral part of the mobile end device 10.

Since both the structure and the components of a mobile end device, for example in the form of a mobile phone, and the various principles of a security element are known, a more detailed description will not be given here and merely the components relevant to the invention will be dealt with in detail.

The security element 11 comprises a memory on which a profile manager 12 and a first subscription profile 13 (or several first subscription profiles) are loaded. As described in the introduction, the data stored on the security element 11 are securely stored and enable the user of the mobile end device 10 (the so-called subscriber) to be uniquely identified. In a manner known to the person skilled in the art, the first subscription profile 13 serves to allow the services supplied by an MNO (mobile network operator) to be utilized by the user by means of the mobile end device 10.

By means of known methods, the profile manager 12 is arranged to load a second subscription profile 14 into the security element 11 so that the user of the mobile end device 10 can utilize services supplied by a different MNO, for example. According to the usual proceeding, regardless of the number of second subscription profiles 14 loaded on the security element, the first subscription profile 13 remains contained in the security element 11. This is also the case when the original, first subscription profile 13 is no longer needed by the user. The method described hereinafter enables an automatic profile maintenance which does not have to be actively initiated by the user.

Figure 2:
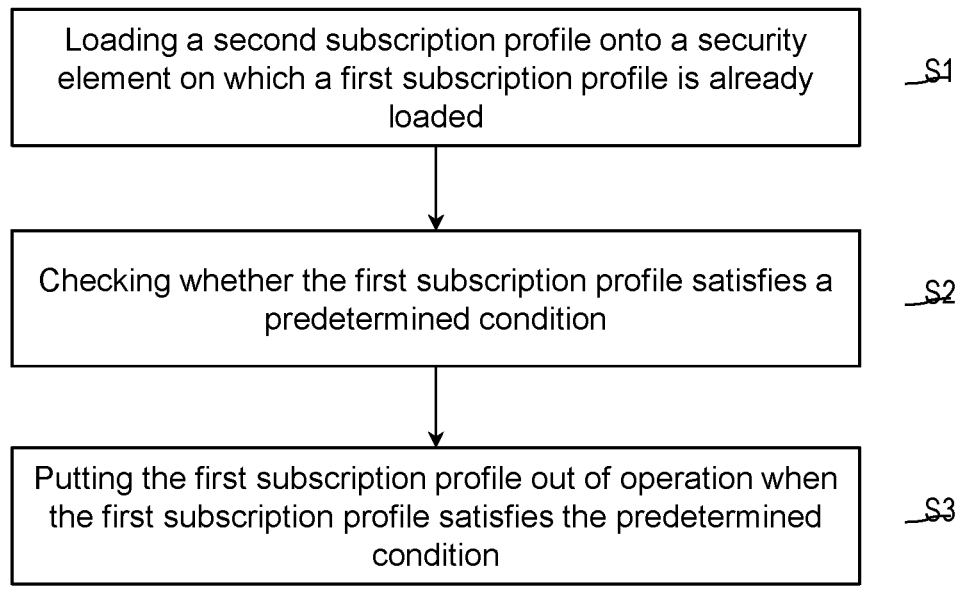
FIG. 2 shows a schematic flowchart illustrating the sequence of the method of the invention for managing subscription profiles.

This proceeding is described in connection with the schematic sequence of the method according to the invention as shown in FIG. 2.

After loading a second subscription profile on the security element 11 on which one or several first subscription profiles are already loaded according to step S1, it is checked according to step S2 whether the first subscription profile 13 satisfies a predetermined condition. The check whether the first subscription profile 13 satisfies the predetermined condition is performed by the profile manager 12. The subsequent step S3, according to which the first subscription profile is put out of operation when the first subscription profile satisfies the predetermined condition, is also performed by the profile manager 12.

As a profile manager, the Issuer Security Domain Root, ISD-R, defined in the GSMA SGP.22 specification can be employed, for example. Putting the first subscription profile 13 out of operation may comprise deleting or deactivating the first subscription profile. This can be done by triggering the execution of an APDU command on the first subscription profile, e.g. by means of the known DELETE or DISABLE command.

Before the profile manager 12 effects the deletion or deactivation of the first subscription profile 13, user information can optionally be generated by the profile manager 12 and output on the user interface 16 of the mobile end device. The user information thus signals to the user of the mobile end device 10 the planned putting out of operation of the first subscription profile 13. The output of the user information by the profile manager 12 may be effected by an LPA (Local Profile Assistant) which enables a selection screen for managing the subscription profiles, displayable on the user interface 16.

The user information comprises interaction information the activation of which by the user is monitored, and upon ascertained activation putting the first subscription profile out of operation (deleting or deactivating it) is prevented or performed. Within the framework of the interaction information, the user can thus be offered the choice whether he/she likes to cancel the procedure of putting out of operation or to delete or merely deactivate the first subscription profile.

Possible conditions for putting the first subscription profile 13 out of operation may be one or several of the following criteria:

leaving a spatially delimited region, in particular when crossing a national border. Deleting the first subscription profile 13 may be expedient, for example, when the user of the mobile end device 10 leaves a holiday destination so that the first subscription profile used during the stay is no longer needed in the future.

ascertaining that an identification code (e.g. a PIN, Personal Identification Number) of the security element has been entered incorrectly a predetermined number of times. The number of trials available to a user may be predetermined by the security element.

ascertaining that a call has been initiated or performed from the mobile end device to a predetermined number. For example, the putting out of operation can be effected after a so-called one-time call has been performed, which is effected, for example, for emergency calls to a specified subscriber number.

ascertaining that a permissible number of authentications of the security element has been performed. In other words, it was ascertained that the maximum number of permissible authentications in the SIM network had been reached.

ascertaining that the at least one first subscription profile has been deleted or deactivated in the Home Location Register (HLR). In this case, when the first subscription profile has been deleted or deactivated in the HLR but is still present in the security element 11, reject information will be transmitted from the PLMN to the security element. In this case, the first subscription profile 13 on the security element 11 can be automatically deleted or deactivated. Here, any boundary conditions can be specified before the putting out of operation is performed. For example, a certain number of rejections can be provided, the putting out of operation being effected only when the predetermined number is exceeded. Similarly, putting out of operation can be made dependent on that information stating the reason being contained in the rejection.

The proposed proceeding enables a (partially) automatic deletion or deactivation of subscription profiles that are no longer utilized or needed. Optionally, the putting out of operation may be authorized by the user. As a result, profile maintenance by the user of the mobile end device is not necessary.

The invention claimed is:

1. A method for managing subscription profiles of a security element which is provided for use in a mobile end device and on which a profile manager and at least one first subscription profile is loaded, comprising the steps of:
loading a second subscription profile from a subscription management server;
checking whether the at least one first loaded subscription profile satisfies a predetermined condition;
putting the at least one first subscription profile out of operation when the at least one first subscription profile satisfies the predetermined condition;
wherein the predetermined condition comprises one or several of the following criteria;
leaving a spatially delimited region when crossing a national border;
ascertaining that an identification code of the security element has been entered incorrectly a predetermined number of times;
ascertaining that a call has been initiated or performed from the mobile end device to a predetermined number;
ascertaining that a permissible number of authentications of the security element has been performed;
ascertaining that the at least one first subscription profile has been deleted or deactivated in a Home Location Register.

2. The method according to claim 1, wherein the step of checking whether the at least one first loaded subscription profile satisfies a predetermined condition and the step of putting out of operation are performed by the profile manager.

3. The method according to claim 1, wherein the step of putting out of operation comprises deleting the at least one first subscription profile.

4. The method according to claim 1, wherein the step of putting out of operation comprises deactivating the at least one first subscription profile.

5. The method according to claim 1, wherein user information is generated and output on a user interface of the mobile end device, which signals a user of the mobile end device that the at least one first subscription profile is put out of operation.

6. The method according to claim 5, wherein the user information comprises interaction information the activation of which is monitored, and upon ascertained activation putting the at least one first subscription profile out of operation is prevented or performed.

7. The method according to claim 1, further comprising the step of loading a computer program product directly into the internal memory of a digital computer, wherein the computer program product comprises software code portions with which the steps according to the method are executed when the product runs on a computer.

8. A security element which is provided for use in a mobile end device, the security element comprising:
a profile manager and at least one first subscription profile, and
wherein the security element is adapted to
load a second subscription profile from a subscription management server;
check whether the at least one first loaded subscription profile satisfies a predetermined condition; and put the at least one first subscription profile out of operation when the at least one first subscription profile satisfies the predetermined condition;

wherein the predetermined condition comprises one or several of the following criteria;

leaving a spatially delimited region when crossing a national border;

ascertaining that an identification code of the security element has been entered incorrectly a predetermined number of times;

ascertaining that a call has been initiated or performed from the mobile end device to a predetermined number;

ascertaining that a permissible number of authentications of the security element has been performed;

ascertaining that the at least one first subscription profile has been deleted or deactivated in a Home Location Register.

9. A mobile end device, wherein this comprises a security element according to claim 8.

* * * * *